United States Patent
Cherrick

(10) Patent No.: US 6,198,513 B1
(45) Date of Patent: Mar. 6, 2001

(54) RECEIVER WITH CHANNEL SURFING MODE

(75) Inventor: Sol M. Cherrick, Chicago, IL (US)

(73) Assignee: Zenith Electronics Corporation, Glenview, IL (US)

( * ) Notice: Subject to any disclaimer, the term of this patent is extended or adjusted under 35 U.S.C. 154(b) by 0 days.

(21) Appl. No.: 09/076,229

(22) Filed: May 12, 1998

Related U.S. Application Data

(63) Continuation-in-part of application No. 08/569,636, filed on Dec. 8, 1995, now abandoned.

(51) Int. Cl.⁷ .................................................. H04N 5/445
(52) U.S. Cl. .......................................... 348/731; 348/734
(58) Field of Search .................................. 348/731, 734, 348/732, 553, 569, 570, 563, 10, 11; 358/188; H04N 5/44, 5/445, 5/45, 5/50

(56) References Cited

U.S. PATENT DOCUMENTS

| | | | |
|---|---|---|---|
| 4,870,492 | * 9/1989 | Hakamada | 348/734 |
| 5,161,023 | * 11/1992 | Keenan | 348/731 |
| 5,353,121 | 10/1994 | Young et al. | 348/563 |
| 5,414,426 | 5/1995 | O'Donnell et al. | 348/734 |
| 5,481,256 | 1/1996 | Darbee et al. | 340/825.56 |
| 5,585,866 | 12/1996 | Miller et al. | 348/731 |
| 5,673,089 | 9/1997 | Yuen et al. | 348/734 |
| 5,886,746 | * 3/1999 | Yuen et al. | 348/731 |

FOREIGN PATENT DOCUMENTS

| | | | |
|---|---|---|---|
| 7-264574 | * 10/1995 | (JP) | H04N/7/173 |
| 01056 | 5/1995 | (WO) | H04N/7/16 |

OTHER PUBLICATIONS

A portion of the User's Manuel for the Mitsubishi CS35803 television receiver, p.2. March 28, 1995, "Star Sight".

* cited by examiner

*Primary Examiner*—David E. Harvey

(57) ABSTRACT

A television receiver has a surfing feature that provides one or more of a plurality of surfing groups for enabling tuning, with up/dn keys, only among designated surf channels in the selected one of the surfing groups. Certain ones of the receivable television signals are designated as memory channels and enable conventional sequential tuning with up/dn keys when the surfing feature is disabled. A surf key on a remote control transmitter or an on-screen cursor controls activation and deactivation of the surfing feature and selection of the surfing groups. An EAROM has bits that may be set to store memory channels, surfing groups and surf channels within the surfing groups.

11 Claims, 5 Drawing Sheets

RECEIVER WITH CHANNEL SURFING MODE

CROSS REFERENCE TO RELATED APPLICATION

This application is a Continuation In Part of U.S. patent application Ser. No. 08/569,636, filed Dec. 8, 1995, now abandoned.

BACKGROUND OF THE INVENTION AND PRIOR ART

This invention relates generally to television receivers and particularly to remotely controlled television receivers that include sequential up and down (up/dn) channel tuning. In conventional remote control television receivers, the user accesses a menu, via a keyboard on the receiver or a hand held remote control unit, for selecting which of the many television channels the receiver is capable of receiving that he wishes to put into a memory so that, when sequentially tuning, only those channels are accessed. Direct access tuning, that is tuning directly to a channel by entry of its channel number, is permitted at all times. In receivers with automatic programming, all receivable channels are put into memory and channels may be deleted (and subsequently added), generally by resorting to a menu.

U.S. Pat. No. 5,673,089 describes a system for surfing among channels that are related by a theme, i.e., a special category such as sports, news, etc. A plurality of theme keys are provided on a remote control transmitter and the various desired channels are included in the "theme" in a separate menu. In one aspect, tuning among the channels in a selected theme occurs automatically for a fixed short period of time until the theme key is operated again. In another aspect, the theme key is operated whenever a channel change within the theme is desired. The television channel up/dn keys are used for sequential tuning among all channels in memory. The system requires additional theme keys, provides no indication of the selected theme to the viewer and does not use the channel up/dn keys for tuning when selecting theme channels, which has the potential of viewer confusion.

With the invention of the above-mentioned copending application, the user is enabled to denominate from among the memory channels, selected ones (surf channels) that are of particular interest. Thus the viewer is able to tune among the surf channels without the necessity of tuning through all the channels in memory or of using direct accessing. When the receiver is in the surf mode, sequential tuning with the television receiver up/dn keys only occurs among the surf channels. For example, a viewer on a Sunday afternoon may wish to view a number of sporting events and may readily access the television receiver menu to denominate those channels of interest as surf channels and thereby be able to sequence through only the selected sporting event channels by the use of up/dn buttons (keys) on the remote control transmitter, or on a receiver keyboard, or with a cursor and channel up/dn icons displayed on the viewing screen of the receiver.

The present invention expands the surfing feature to provide for a number of surfing groups that may be individually created so that, when in any particular surfing group, operation of the television receiver up/dn keys only tunes to surf channels within the selected surfing group. These surfing groups may be individually identified as to content, source or any other viewer-determined criterion. For example, one surfing group may be devoted to sports, another to news, etc. Also, a surfing group may identify its user and be labelled accordingly. Such labelling might be Dad, Mom, Joey, etc. With the present invention, a single viewer-operated control (a surf key on the remote control transmitter, or an on screen cursor) is used to activate and deactivate the surfing feature, and to change among the surfing groups. Tuning among the surf channels in any of the surfing groups occurs in response to the same channel up/dn keys of the television receiver. Also, an on-screen display advises the viewer of the active surfing group to avoid any confusion. One or more of the surfing groups may be deleted, if desired to avoid cycling through inactive surfing groups.

OBJECTS OF THE INVENTION

A principal object of the invention is to provide a novel method and apparatus for operating a television receiver.

Another object of the invention is to provide an improved method of channel tuning in a television receiver.

A further object of the invention is to enable a viewer to create special groups of desired channels from the normal memory channels, and to sequentially tune among only the channels in a selected group with the television receiver up/dn keys.

BRIEF DESCRIPTION OF THE DRAWINGS

These and other objects and advantages of the invention will be apparent upon reading the following description in conjunction with the invention, in which.

DESCRIPTION OF THE PREFERRED EMBODIMENT

Figure 1:
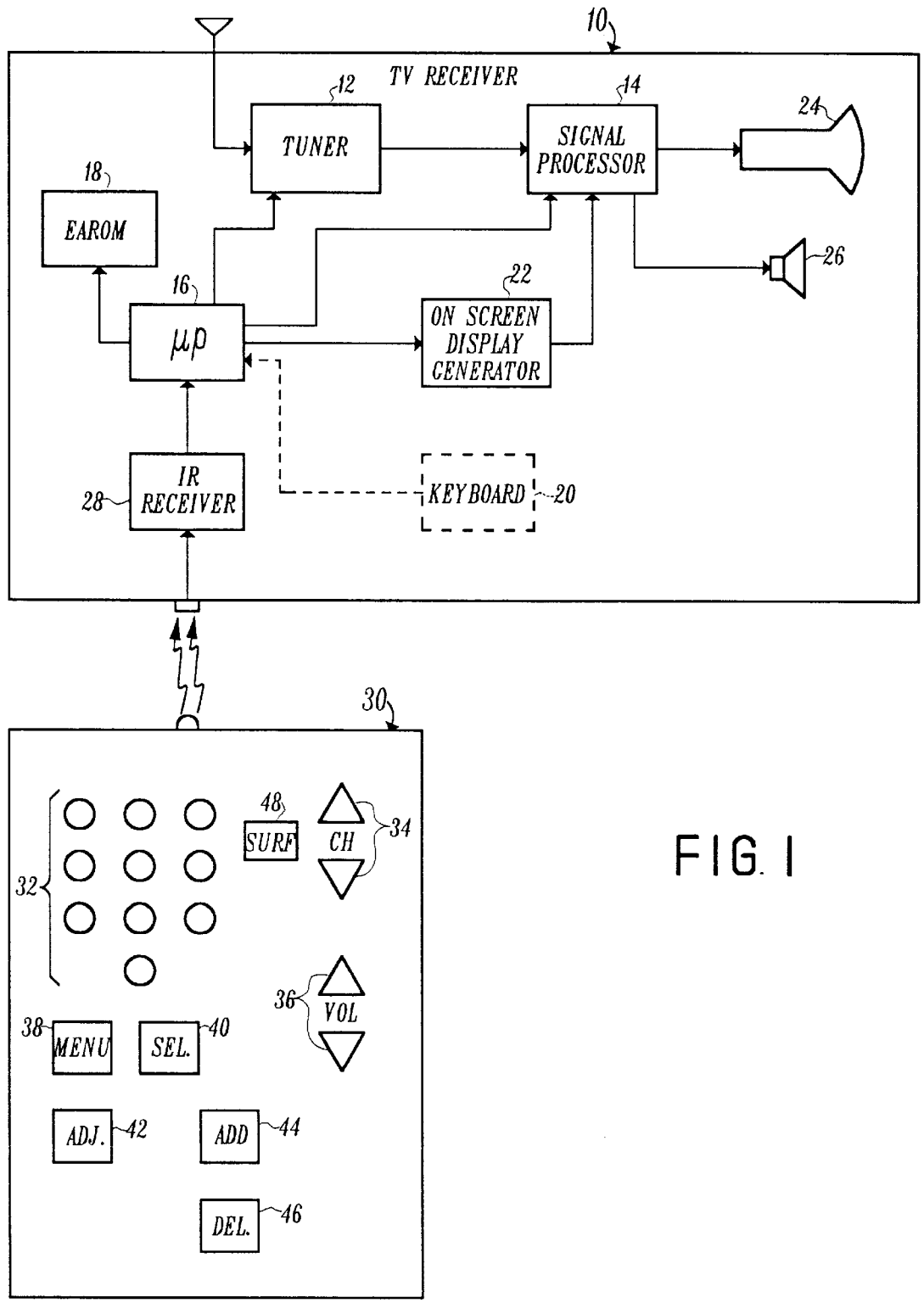
FIG. 1 is a simplified block diagram of a television receiver and a companion remote control transmitter incorporating the invention.

In FIG. 1, reference character 10 denotes a television receiver of generally conventional construction. Receiver 10 includes a tuner 12 that supplies a received television signal to a conventional signal processor 14. A microprocessor 16 controls operation of the various elements of receiver 10. Microprocessor 16 is in communication with a tuning EAROM 18 which stores channel information. An optional keyboard 20 (in dashed lines) is situated on the receiver for controlling its various functions, such as channel tuning, volume, control, etc. An on-screen display generator 22 is provided for producing various texts and menus on the television viewing screen under control of microprocessor 16. A cathode ray tube (CRT) 24 of conventional design is driven by signal processor 14, as is a loudspeaker 26. An IR receiver 28 receives infrared control commands from a remotely located transmitter 30 and supplies information to microprocessor 16. As mentioned previously, television receiver 10 is in all respects conventional with the exception of the types of displays produced by on-screen display 22 and EAROM 18.

Remote control transmitter 30 is similarly of conventional construction and includes a plurality of numerical keys or buttons 32 for direct entry of television channel numbers and a pair of channel up/dn keys 34 for sequential tuning of the tuner 12 in receiver 10 among the various channels, either in an ascending or descending order. A pair of volume control keys 36 provide for increasing and decreasing the volume. Transmitter 30 also includes a menu key 38 for displaying various menus on CRT 24 for enabling on-screen programming by the viewer. Other keys such as a select key 40, an adjust key 42, an add key 44 and a delete key 46 may be provided to enable the determination of certain programming functions, denominate the channels, step through menu items, etc., all such being well known in the art. In addition, transmitter 30 includes a surf key 48, which as will be described, is used to select surfing groups and to activate and deactivate the surfing feature or mode when tuning. When the surfing feature is activated, the normal memory-tuning mode of the receiver is deactivated and vice versa.

Figure 2A:
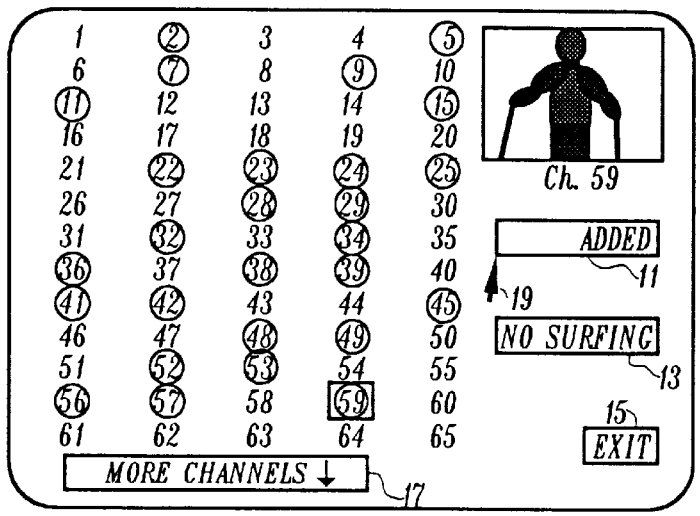
FIGS. 2A–2C are menu displays indicating denomination of the channels.
Figure 2B:
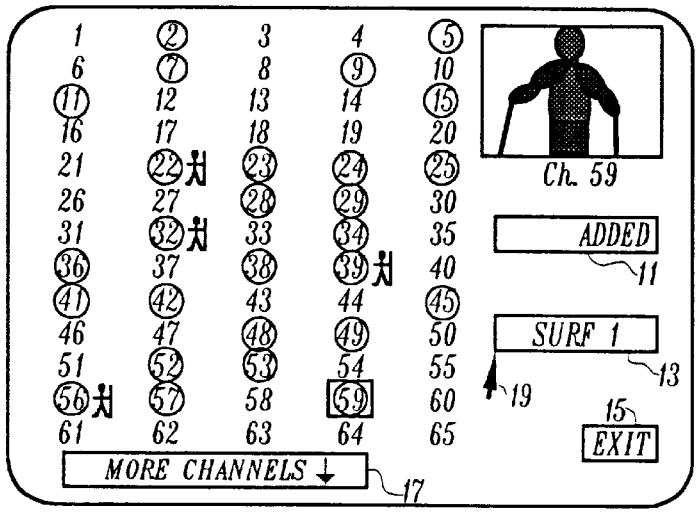
Figure 2C:
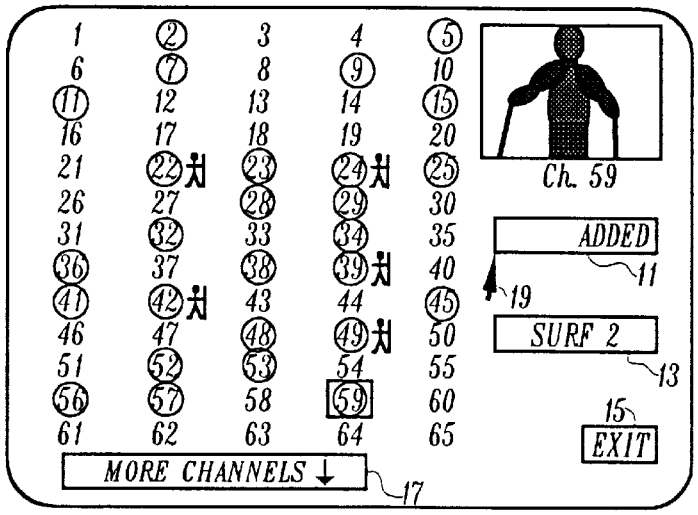

FIGS. 2A–2C illustrate representative displays on cathode ray tube 24 of television receiver 10 in response to appropriate operation of menu key 38 on transmitter 30. In particular a menu (not shown), including a selection for adding, deleting and denominating channels, gives rise to these displays. The displays indicate all of the channel numbers for the television receiver and the status of their associated channels by means of color, background, highlighting or other conventional indicia. In FIG. 2A, the receivable channels in the service area of the television receiver are indicated by the circled numbers. As mentioned above, the television receiver preferably includes an automatic tuning feature in which all of the receivable channels are stored in memory. These stored channels are referred to herein as memory tuning channels and are accessible in sequence by simply operating the up/dn keys or buttons 34 on the remote control unit (or on the television receiver itself). The selected one of the receivable channels is indicated by a box around the circled number 59. A small inset live picture of the program being shown on the selected channel (59) is included in the upper right hand corner of the display. In practice, the selected channel number will simply be highlighted or displayed in a different color. (The circles and boxes are used herein for clarity). A text block 11 displays the text "Added" when channel 59 is selected (highlighted) in response to operation of the channel up/dn keys 34 or a cursor 19 that may be controlled by suitable keys or a trackball, (neither being shown). Should the viewer wish to delete channel 59 from the television receiver tuning memory, the delete key 46 of the remote control unit may be operated and the text block 11 will display the word "deleted". Cursor 19 may also be used by clicking on the selected channel number or on text block 11. The circle around number 59 is removed indicating that the channel is no longer in the channel up/dn memory. (All channels, of course, continue to be accessible by direct entry of their channel numbers during normal television operation.)

The viewer may continue the process until the display of FIG. 2A has all of the channels that meet some special criterion of the viewer highlighted, i.e., included in the up/dn channel memory of the television receiver. Appropriate bits in EAROM 18 are set to indicate the memory channels. Additional channel numbers are accessible by clicking on a text block 17 that bears the legend "More Channels". The menu mode may be exited by clicking on a text block 15 labelled "Exit". There is also a text block 13 that has the legend "No Surfing" displayed therein. Operating the surf key 48 on the remote control unit or clicking on text block 13 with cursor 19 will change the display to that illustrated in FIG. 2B.

With the surfing feature of the invention, four different surfing groups are available and are accessible by repeated operation of the surf key 48 or by clicking the cursor on text block 13. A lesser number of surfing groups may be used, or the feature may be disabled entirely, depending upon the viewer's preferences. As in FIG. 2A, the display indicates all of the channel numbers with those that have been added, i.e., denominated or selected as memory tuning channels, being highlighted (circled). Additionally a surfing icon appears adjacent to any of the memory tuning channels that have been denominated as surf channels in surfing group 1. The denominated surf channels in surfing group 1 are channels 22, 32, 39 and 56. The selected channel 59 (indicated by the box around number 59) is not a surf channel and therefore no surfing icon appears adjacent to channel number 59. The viewer may designate channel 59, or any other memory tuning channel, as a surf channel in surfing group 1, by doing any of the following for the selected channel: operating Add key 44 (or any other designated key on the keyboard); clicking cursor 19 on the channel number; or clicking the legend "Added" in text block 11, whereupon the legend "Added" is replaced with the legend "Surf" in text block 11 and a surfing icon is displayed adjacent to channel 59. Separate bits are set in EAROM 18 for channels designated as surf channels in surfing group 1. Only "Added" channels, that is channels that are in the up/dn channel memory of the television receiver, may be designated as surf channels. Removal of a surf channel from a surfing group is accomplished in the same manner.

The viewer may select additional surfing groups, nominally identified by numbers, for other categories or groupings of favorite channels, or to suit the individual preferences of the viewer or of other viewers. The various surfing groups are cycled through by depressing surf key 48, or by clicking cursor 19 on text block 13. Again, appropriate bits in the EAROM are set to indicate the different surfing groups.

In FIG. 2C, the surfing group 2 has been selected (by operating surf key 48 or by clicking the cursor on text block 13) and the display indicates those of the memory channels that have been designated as surf channels in surfing group 2. The surf channels in surfing group 2 are channels 22, 24, 39, 42 and 49. Changes may be made to the channels in surfing group 2 as described in connection with surfing group 1. While not illustrated, surfing groups 3 and 4 may be accessed in a similar manner and the particular desired ones of the memory channels in the memory of the television receiver designated as surf channels therein. Provision is made in a surf identification menu (not illustrated) to enable the viewer to select descriptive names for the various surfing groups in place of the default numerical ones provided. In this menu one or more of the surfing groups may be deleted to avoid the need to cycle through them when the surfing feature is activated.

In operation, CRT 74 normally displays (for a short time period) the channel number of the channel to which the receiver is tuned along with the time of day, etc. If the receiver has been placed in the surf mode, (surfing feature activated), either by operation of surf key 48 or by clicking cursor 19 in a designated area of the viewing screen (not illustrated), surf information, including the surfing group number (or name) is also displayed. With the surfing feature activated, operation of up/dn keys 34 on the remote control transmitter (or corresponding keys on a receiver keyboard, or with a cursor and channel up/dn icons displayed on the viewing screen of the receiver), causes the receiver to sequentially tune only among the denominated surf channels in the surfing group displayed. Thus if surfing mode 1 is displayed, operation of up/dn keys 34 will tune the receiver sequentially only among channels 22,32, 39 and 56. Similarly, for surfing group 2, only channels 22, 24, 39, 42 and 49 will be tuned by operation of up/dn keys 34 on the remote control transmitter (or corresponding keys on a receiver keyboard, or with a cursor and channel up/dn icons displayed on the viewing screen of the receiver). The surfing group display only appears during sequential tuning of channels when the surfing feature is activated. Direct entry of a surf channel number in the memory tuning mode will not activate the surfing feature nor produce a surfing group display on the CRT.

Figure 3:
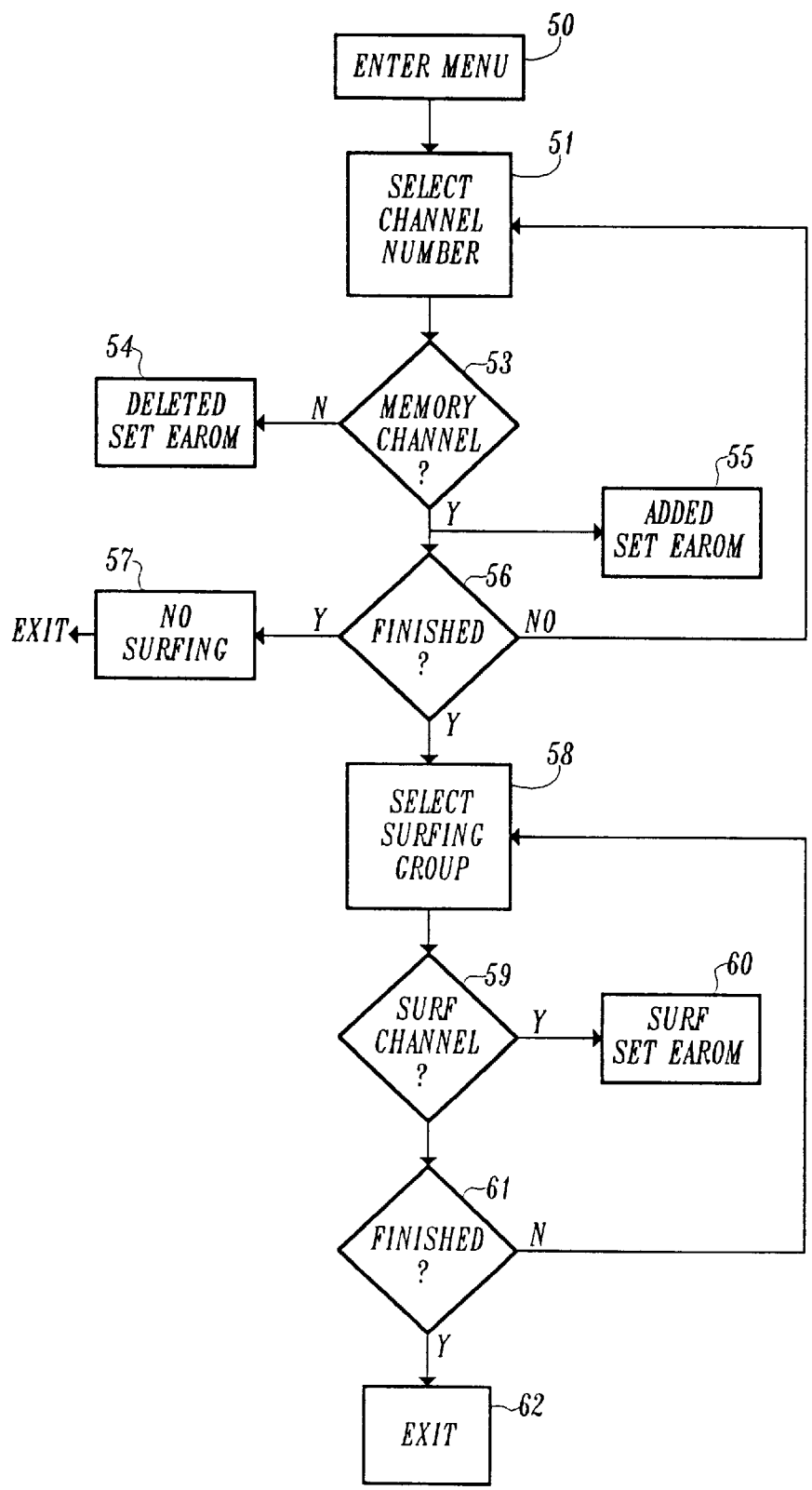
FIG. 3 is a flow chart describing how the channels are denominated.
Figure 4:
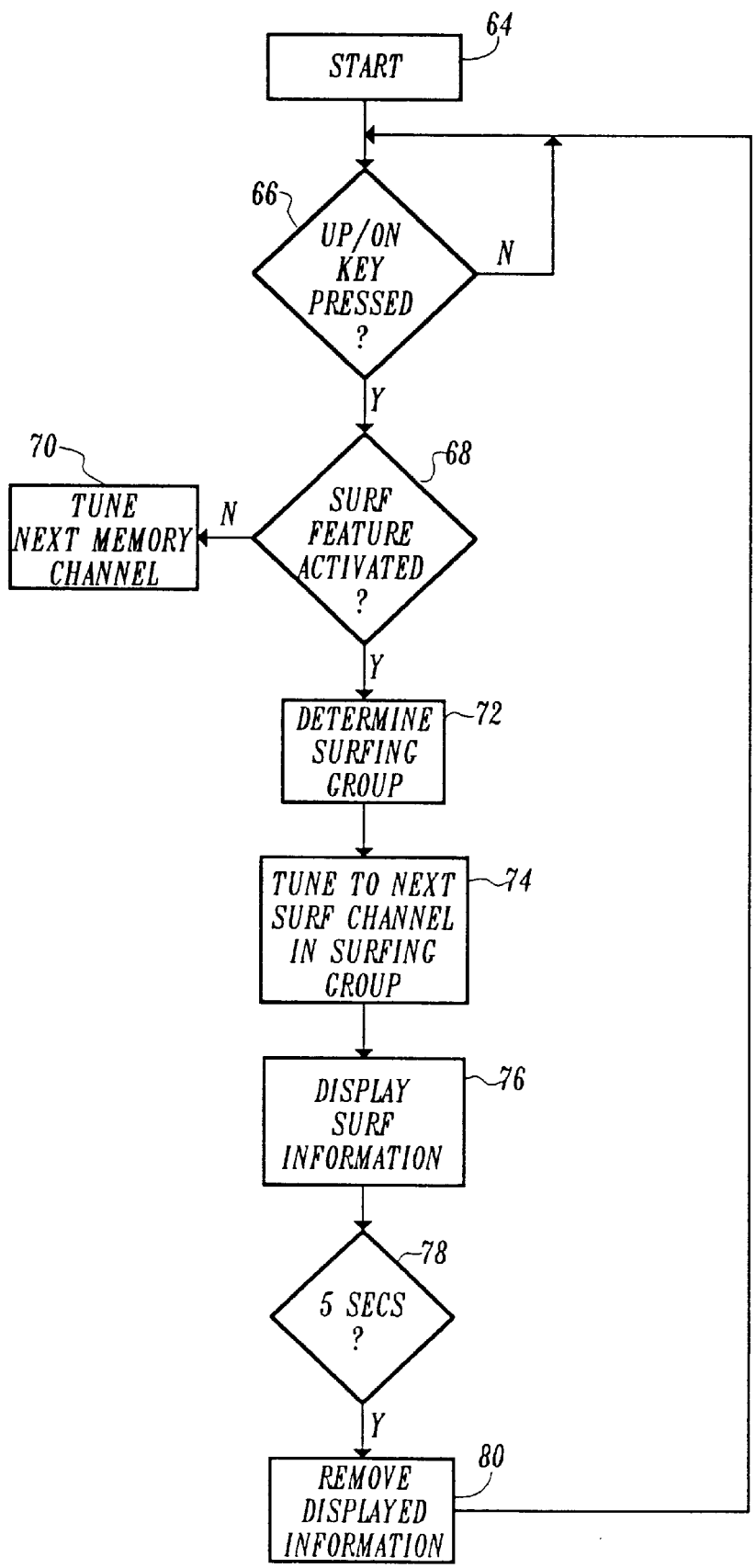
FIG. 4 is a flow chart illustrating operation of the television receiver tuning.
Figure 5:
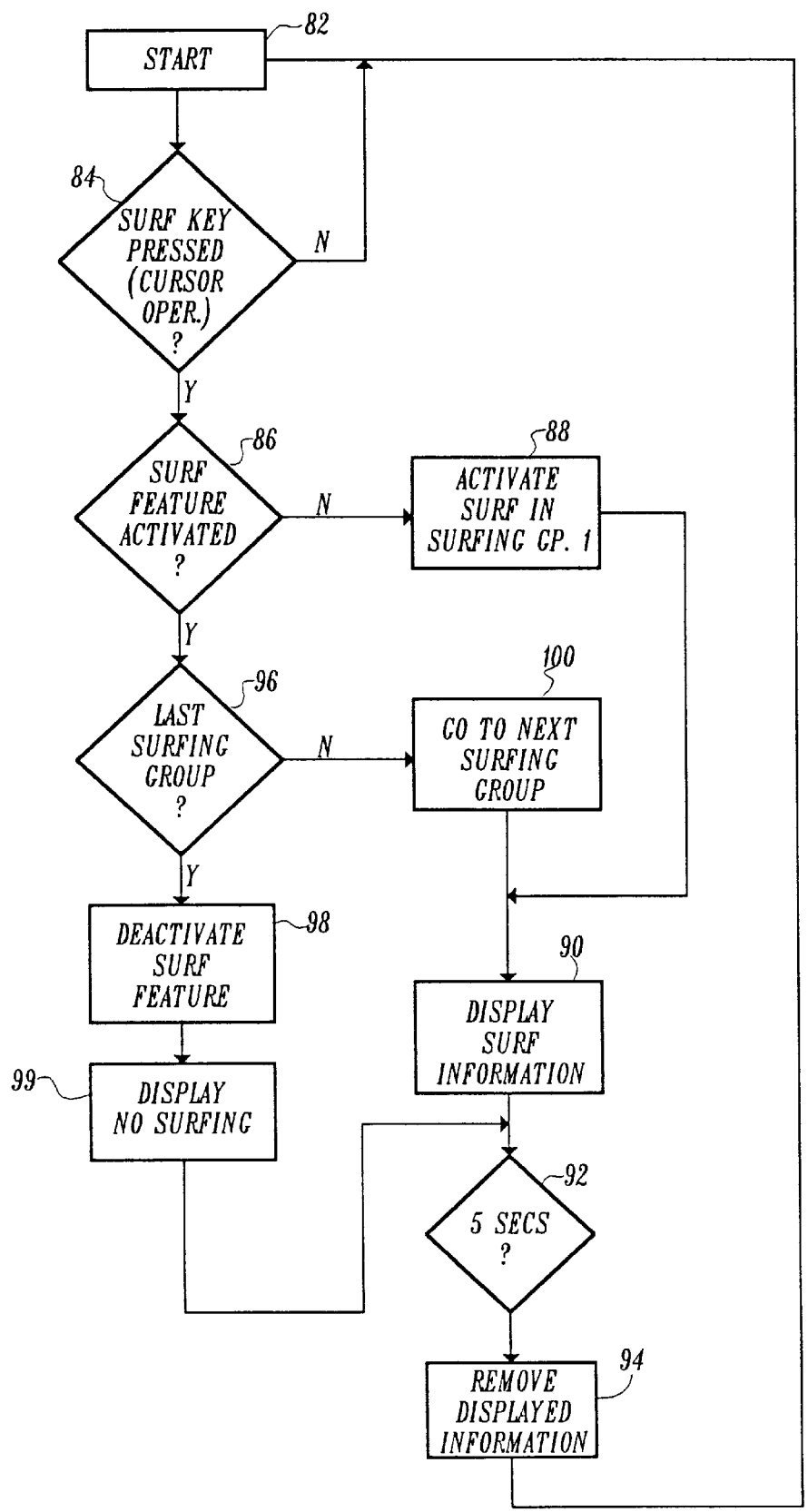
FIG. 5 is a flow chart illustrating activation and deactivation of the surfing feature.

The FIGS. 3, 4 and 5 are flow charts illustrating the various operations of the invention. In FIG. 3, which illustrates the selection or denomination of memory channels, the surf channels and the surfing groups, the on-screen menu is entered in step 50 and a channel number is selected in step 51. This may be by direct entry from the numerical keys 32, operation of channel up/dn keys 34 on remote control transmitter 30 (or operation of similar keys of the television receiver keyboard) or selection by cursor 19. In step 53, the channel number is denominated in the memory as either being deleted (step 54) or added (step 55), with corresponding setting of bits in EAROM 18. This is continued until the viewer finishes (step 56) by exiting the channel memory setup (step 57) or selecting one of the surfing groups (step 58). Selection of the surfing groups and selection of the individual channels in each surfing group as surf channels occurs in step 59, with appropriate bits being set in the EAROM (step 60). (The surfing group identifications may be changed in a different menu program as previously discussed.) In step 61, if the surf channel selection is not finished for all of the operational surfing groups, the cycle is repeated. If the surf channel programming is finished, the menu is exited in step 62.

FIG. 4 is a flow chart of operation of the television receiver with up/dn keys 34. The start is illustrated at step 64. In step 66, the status of the channel up/dn keys is interrogated. If either has been depressed, indicating desired sequential tuning of the receiver, it is determined whether the surfing feature is activated (step 68). If it has not been activated, the next sequential memory channel (based upon EAROM 18) is tuned (step 70). If the surfing feature is activated, step 72 determines which of the surfing groups has been selected and step 74 tunes to the next sequential surf channel in that surfing group (based upon the settings of the bits in EAROM 18). (This may be in either the up or down direction, depending upon which of the channel keys 34 is depressed.) In step 76, the appropriate surfing information is displayed on the viewing screen of the CRT. In step 78, a time period of five seconds is measured after which the displayed surf information on the CRT is removed.

In FIG. 5, activation and deactivation of the surfing feature are illustrated. Start (step 82) initiates the operation. The status of surf key 48, i.e. whether the surf key is pressed or not is determined (step 84). This step may also include determining whether cursor 19 has been clicked in a selected surfing area on the face of CRT 24. If the surf key has been pressed or the cursor clicked in the surfing area of the viewing screen, the question is whether the surfing feature is already activated (step 86). If it has not been activated, it is activated in step 88 to the first surfing group and the surfing information is displayed on the CRT in step 90. Channel tuning among the various surf channels in the first surfing group now occurs in response to operation of up/dn keys 34 on the remote control transmitter (or corresponding keys on a receiver keyboard, or with a cursor and channel up/dn icons displayed on the viewing screen of the receiver), with each channel change being accompanied by a CRT display of the channel number and the surfing information. If the surfing feature is already activated, the next surfing group is accessed, accompanied by a display of the appropriate surf information (step 90). The surf information persists for five seconds (step 92) before being removed from the CRT. Sequencing continues through the designated surfing groups in response to further operations of the surf key until the last surfing group is reached (step 96). On the next operation of the surf key, the surfing feature is deactivated (step 98). In step 99 a special display "no surfing" is generated to indicate that the surfing feature has been deactivated. After the passage of five seconds, this special display is removed (step 94).

It will be appreciated that the provision of surf key 48 on the remote control unit simplifies things for the viewers who, because of the toggle nature of the surf key accompanied by the surf information displays, are enabled to readily switch into and out of their desired surfing groups. Thus the invention greatly facilitates the selection of special designated channels that the viewer only wishes to tune among in selected surfing groups. As mentioned above, the viewer also has the option of disabling one or more of the surfing groups (in a menu mode) to avoid the necessity of cycling through unused surfing groups when the surfing feature is used. Thus instead of the normal sequence of surfing group 1, 2, 3, 4 and surfing off, the sequence may be shortened by eliminating unused surfing groups so that it may be, for example, surfing group 1, 2 and surfing off. The use of the same channel tuning mechanism, i. e., channel up/dn keys, and/or on-screen cursor and icons, coupled with the surfing information displays and the single viewer-operated control for activating/deactivating and changing surfing groups minimizes viewer confusion in the operation of the television receiver with a multiple surfing group feature.

What has been described is a novel arrangement in which one or more sets or groups of surf channels may be established to suit individual preferences of a viewer or viewers. Tuning is accomplished among only the designated surf channels in a selected surfing group by operation of the channel up/dn keys. It is recognized that changes in the described embodiment of the invention will be apparent to those skilled in the art without departing from its true spirit and scope. The invention is to be limited only as defined in the claims.

What is claimed is:

1. A method of operating a television receiver having a surfing feature comprising:

tuning to individual ones of a plurality of television channels;

enabling a user to denominate a set, less than all, of the plurality of television channels as memory channels in the television receiver memory;

selecting among one or more surfing groups;

enabling the user to denominate a subset, less than all, of the set of the memory channels as surf channels in the one or more surfing groups base on the denominated set of memory chanels;

when the surfing feature is deactivated, sequentially tuning among all of the memory channels with the television receiver up/dn channel keys; and when the surfing feature is activated, sequentially tuning only among the surf channels in the corresponding selected one or more surfing groups with the television receiver up/dn channel keys.

2. The method of claim 1 further comprising:
displaying surf information that indicates which of the one or more surfing groups is selected.

3. The method of claim 2 further comprising:
removing the displayed surf information after a predetermined time period has elapsed.

4. The method of claim 1 further comprising:
setting bits in an EAROM to denominate memory channels, surfing groups and surf channels within the one or more surfing groups.

5. The method of claim 2, further including providing for disabling one or more of the surfing groups by the user, if desired.

6. The method of claim 4, further including providing a viewer control for activating and deactivating the surfing feature and changing among the surfing groups.

7. A television receiver including a surfing feature and having one or more surfing groups comprising:
tuning means for tuning to a plurality of television channels by direct input of channel numbers;
memory means for storing channel numbers in a television receiver memory;
menu means for enabling a user to:
denominate a set, less than all, of said television channels as memory channels;
select a surfing group among said one or more surfing groups; and
denominate a subset, less than all of said set, of said memory channels as surf channels in said selected one or more of said surfing groups based on the denominated set of memory channels; and
viewer-operated control means for activating said surfing feature and for selecting among said one or more surfing groups;
whereby, when said surfing feature is deactivated, sequential tuning of corresponding memory channels with up/dn channel keys occurs and, with said surfing feature deactivated, sequential tuning with said up/dn channel keys occurs only among said subset of said surf channels in said selected surfing group.

8. The receiver of claim 7 wherein said memory means comprises an EAROM having bits for storing channel number, surfing group and surf channel data for each television channel and further comprising:
means for setting said bits to denominate said memory channels, said surfing groups and said surf channels in said selected surfing groups.

9. The receiver of claim 8, further including a viewing screen and a remote control transmitter: and
means on said remote control transmitter for selecting a menu display on said viewing screen for enabling setting of said memory channel, surfing group and surf channel bits for each of said television channels.

10. The receiver of claim 9, wherein said viewer operated control means comprises a surf key on said remote control transmitter.

11. The receiver of claim 9, wherein said viewer operated control means comprises an on-screen cursor.

* * * * *